(12) United States Patent
Light-Holets et al.

(10) Patent No.: US 11,428,133 B2
(45) Date of Patent: Aug. 30, 2022

(54) SYSTEMS AND METHODS FOR MANAGING CATALYST TEMPERATURE BASED ON LOCATION

(71) Applicants: Cummins Inc., Columbus, IN (US); Tula Technology, Inc., San Jose, CA (US)

(72) Inventors: Jennifer Kay Light-Holets, Greenwood, IN (US); J. Steven Kolhouse, Columbus, IN (US); Govindarajan Kothandaraman, Columbus, IN (US); Carlos Alcides Lana, Columbus, IN (US)

(73) Assignees: Cummins Inc., Columbus, IN (US); Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/330,062

(22) Filed: May 25, 2021

(65) Prior Publication Data

US 2021/0372312 A1    Dec. 2, 2021

Related U.S. Application Data

(60) Provisional application No. 63/030,479, filed on May 27, 2020.

(51) Int. Cl.
*F01N 3/20* (2006.01)
*F02D 41/02* (2006.01)
(Continued)

(52) U.S. Cl.
CPC ........... *F01N 3/2013* (2013.01); *F01N 3/208* (2013.01); *F02D 41/024* (2013.01); *F02D 41/40* (2013.01);
(Continued)

(58) Field of Classification Search
CPC .... F01N 3/2013; F01N 3/208; F01N 2610/03; F01N 2900/104; F01N 2900/12;
(Continued)

(56) References Cited

U.S. PATENT DOCUMENTS 3,975,951 A    8/1976  Kohama et al.
4,449,362 A    5/1984  Frankenberg et al.
(Continued)

FOREIGN PATENT DOCUMENTS

DE    10 2008 030 307    12/2009
DE    10 2012 007 053    10/2013
(Continued)

OTHER PUBLICATIONS

International Search Report and Written Opinion on PCT/US2020/034650, dated Aug. 4, 2020, 11 pages.

*Primary Examiner* — Brandon D Lee
(74) *Attorney, Agent, or Firm* — Foley & Lardner LLP

(57) ABSTRACT

Systems and apparatuses include a controller including at least one processor coupled to a memory storing instructions that, when executed by the at least one processor, causes the controller to: determine a set of emission regulations based on a location of a vehicle; determine a target temperature of a catalyst of an aftertreatment system of the vehicle in response to the determined set of emission regulations; compare a current temperature of the catalyst to the determined target temperature; and in response to the current temperature of the catalyst being below the determined target temperature, provide a thermal management command to increase the catalyst temperature toward the determined target temperature.

20 Claims, 3 Drawing Sheets

(51) Int. Cl.
*F02D 41/40* (2006.01)
*G01S 19/42* (2010.01)
*F02D 41/00* (2006.01)

(52) U.S. Cl.
CPC .... *F01N 2610/03* (2013.01); *F01N 2900/104* (2013.01); *F01N 2900/12* (2013.01); *F01N 2900/1602* (2013.01); *F02D 41/0087* (2013.01); *F02D 2200/0802* (2013.01); *F02D 2200/701* (2013.01); *G01S 19/42* (2013.01)

(58) Field of Classification Search
CPC ....... F01N 2900/1602; F01N 2900/102; F01N 2900/1631; F02D 41/024; F02D 41/40; F02D 41/0087; F02D 2200/0802; F02D 2200/701; F02D 41/1446; F02D 2041/0012; G01S 19/42
See application file for complete search history.

(56) References Cited

U.S. PATENT DOCUMENTS

| | | | |
|---|---|---|---|
| 5,746,053 A | 5/1998 | Hibino | |
| 6,032,461 A | 3/2000 | Kinugasa et al. | |
| 6,325,053 B1 | 12/2001 | Zappador et al. | |
| 6,477,831 B1 | 11/2002 | Ballinger et al. | |
| 6,681,563 B1 | 1/2004 | Glugla et al. | |
| 7,104,051 B2 | 9/2006 | Shimasaki et al. | |
| 8,042,326 B2 | 10/2011 | Farell et al. | |
| 8,051,644 B2 | 11/2011 | Gonze et al. | |
| 8,117,832 B2 | 2/2012 | Wagner et al. | |
| 8,347,607 B2 | 1/2013 | Gonze et al. | |
| 8,475,574 B2 | 7/2013 | Gonze et al. | |
| 8,505,282 B2 | 8/2013 | Gonze et al. | |
| 8,883,102 B1 | 11/2014 | Lambert et al. | |
| 9,038,376 B2 | 5/2015 | Petrovic et al. | |
| 9,328,674 B2 | 5/2016 | Geveci et al. | |
| 9,388,722 B2 | 7/2016 | Gonze et al. | |
| 9,470,128 B2 | 10/2016 | Silvers et al. | |
| 9,863,352 B2 | 1/2018 | Stenlaas et al. | |
| 9,878,767 B2 | 1/2018 | Dahlberg et al. | |
| 9,968,886 B2 | 5/2018 | Balenovic et al. | |
| 10,273,846 B2 | 4/2019 | Baensch et al. | |
| 10,371,029 B2 | 8/2019 | Sakuma et al. | |
| 10,408,103 B1 | 9/2019 | Miao et al. | |
| 10,494,971 B2 | 12/2019 | Younkins et al. | |
| 2009/0000604 A1 | 1/2009 | Bond et al. | |
| 2012/0102920 A1 | 5/2012 | Pipis, Jr. | |
| 2012/0173062 A1 | 7/2012 | Madurai Kumar et al. | |
| 2013/0047607 A1 | 2/2013 | Petrovic | |
| 2013/0213010 A1 | 8/2013 | Zhang et al. | |
| 2015/0315952 A1 | 11/2015 | Hall | |
| 2016/0153417 A1 | 6/2016 | Tochigi | |
| 2017/0130630 A1 | 5/2017 | Younkins | |
| 2018/0094556 A1 | 4/2018 | Kurtz et al. | |
| 2018/0142599 A1 | 5/2018 | Pannuzzo et al. | |
| 2018/0202985 A1* | 7/2018 | Wait | B61L 3/002 |
| 2018/0334939 A1 | 11/2018 | Mital et al. | |
| 2018/0334970 A1 | 11/2018 | Kamo | |
| 2019/0155230 A1 | 5/2019 | Culbertson et al. | |
| 2019/0360415 A1 | 11/2019 | Romanato | |
| 2020/0102874 A1 | 4/2020 | Kurtz et al. | |
| 2020/0408163 A1 | 12/2020 | Webb et al. | |

FOREIGN PATENT DOCUMENTS

| | | |
|---|---|---|
| DE | 10 2015 200 023 | 7/2015 |
| GD | 2 478 541 | 9/2011 |
| WO | WO-2006/012484 | 2/2006 |
| WO | WO-2006/100051 | 9/2006 |
| WO | WO-2008/109215 | 9/2008 |
| WO | WO-2012/040613 | 3/2012 |
| WO | WO-2014/055018 | 4/2014 |
| WO | WO-2016/029207 | 2/2016 |
| WO | WO-2020/074268 | 4/2020 |
| WO | WO-2021/069162 | 4/2021 |

* cited by examiner

SYSTEMS AND METHODS FOR MANAGING CATALYST TEMPERATURE BASED ON LOCATION

CROSS-REFERENCE TO RELATED APPLICATION

This application claims the benefit of and priority to U.S. Pat. App. No. 63/030,479, titled "SYSTEMS AND METHODS FOR MANAGING CATALYST TEMPERATURE BASED ON LOCATION," filed May 27, 2020, which is incorporated herein by reference in its entirety and for all purposes.

TECHNICAL FIELD

The present disclosure relates to systems and methods for managing a temperature of a catalyst of an aftertreatment system for an engine system based on a location of the aftertreatment system.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing. Exhaust aftertreatment systems are generally designed to reduce emission of particulate matter, nitrogen oxides, hydrocarbons, and other environmentally harmful pollutants.

SUMMARY

One embodiment relates to a system that includes: a controller comprising at least one processor coupled to a memory storing instructions that, when executed by the at least one processor, causes the controller to perform operations comprising: determining a set of emission regulations based on a location of a vehicle; determining a target temperature of a catalyst of an aftertreatment system of the vehicle in response to the determined set of emission regulations; comparing a current temperature of the catalyst to the determined target temperature; and in response to the current temperature of the catalyst being below the determined target temperature, providing a thermal management command to increase the catalyst temperature toward the determined target temperature.

Another embodiment relates to a method that includes: determining, by a controller, a set of emission regulations based on a location of a vehicle; determining, by the controller, a target temperature of a catalyst of an aftertreatment system of the vehicle in response to the determined set of emission regulations; comparing, by the controller, a current temperature of the catalyst to the determined target temperature; and in response to the current temperature of the catalyst being below the determined target temperature, providing, by the controller, a thermal management.

Another embodiment relates to a system that includes: a controller comprising at least one processor coupled to a memory storing instructions that, when executed by the at least one processor, causes the controller to perform operations comprising: determining a set of emission regulations based on a location of a vehicle; determining a target temperature of exhaust gas in an aftertreatment system of the vehicle in response to the determined set of emission regulations; comparing a current temperature of the exhaust gas to the determined target temperature; and in response to the current temperature of the exhaust gas being below the determined target temperature, providing a thermal management command to increase an exhaust gas temperature toward the determined target temperature.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
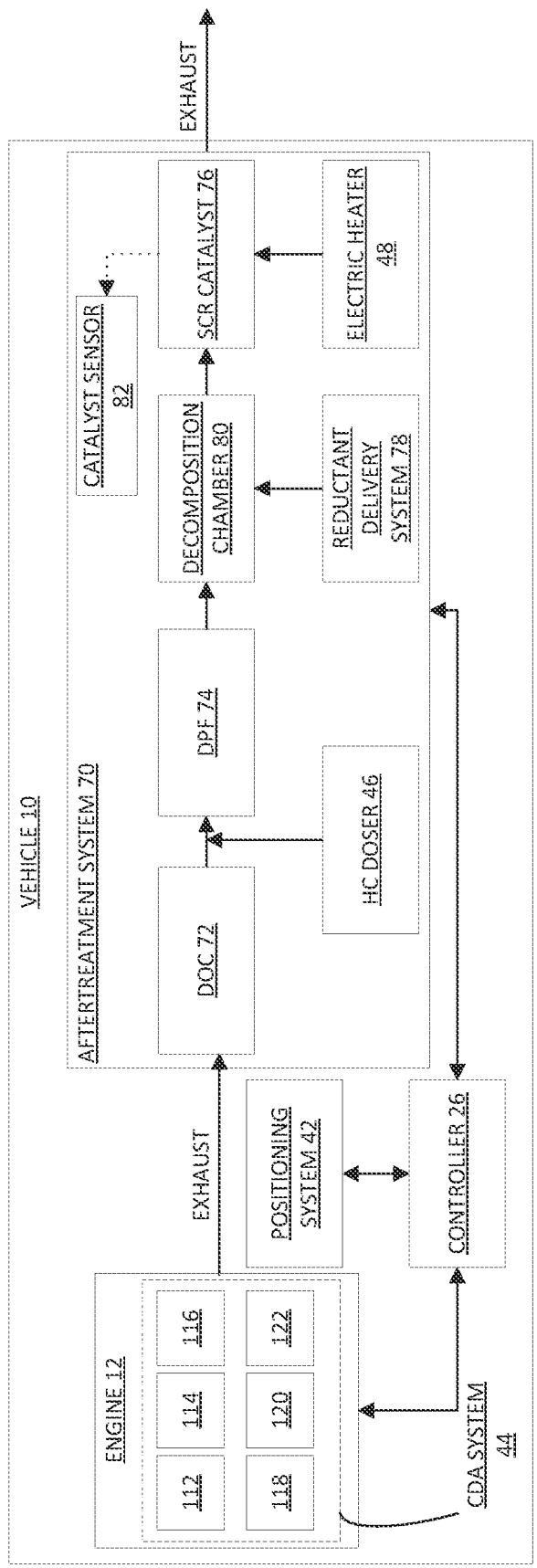
FIG. 1 is a schematic diagram of an engine and exhaust aftertreatment system for a vehicle, according to an exemplary embodiment.

Following below are more detailed descriptions of various concepts related to, and implementations of, methods, apparatuses, and systems for enabling catalyst "stay-warm" and related procedures in response to a physical location of the vehicle. Before turning to the figures, which illustrate certain exemplary embodiments in detail, it should be understood that the present disclosure is not limited to the details or methodology set forth in the description or illustrated in the figures.

Referring to the Figures generally, the various embodiments disclosed herein relate to systems, apparatuses, and methods for managing a temperature of a catalyst of an aftertreatment system and, particularly a Selective Catalytic Reduction ("SCR") system catalyst, based on a physical location of the vehicle. In operation, the systems, methods, and apparatuses of the present disclosure alter the temperature of the catalyst based on the local emission regulations based on the physical location of the vehicle. The SCR system is an important component in reducing emissions from diesel engines. SCR may utilize a two-step process: a doser injects a reductant into the exhaust stream, and then the exhaust passes through a SCR catalyst that converts the exhaust gas into less harmful particulates that can be released into the atmosphere (particularly, conversion of NOx into less harmful compounds). However, if the SCR catalyst is not at a certain temperature, the chemical reduction will either not occur or will occur at a much lower efficiency. For example, when a vehicle transitions from an off state to an on state, a period of time exists before the SCR catalyst is operating as intended which coincides with the temperature of the catalyst being below a desired temperature threshold. During this warm-up period, elevated pollutants may result. This higher level of pollutants can be problematic in certain jurisdictions in which the local regulations require ultra-low NOx levels. Moreover, different jurisdictions may have different pollutant/emissions requirements (e.g., NOx levels). As a result, the desired operating temperature for the catalyst may differ based on the jurisdiction. More stringent requirements (e.g., ultra-low NOx jurisdictions, such as those prescribed by the California Air Resources Board) may require the catalyst to reach a desired operating temperature more quickly than less stringent jurisdictions.

According to the present disclosure, a controller of the vehicle is coupled the engine and aftertreatment system. The controller may track the location of the vehicle, and determine a set of emission regulations based on a location of the vehicle (e.g., via a lookup table that stores the regulations as a function of location, via a telematics device that sends the vehicle location to a remote operator which then provides the regulations, etc.). The controller may then determine a target temperature of at least one of the SCR catalyst of the aftertreatment system or a temperature of the exhaust gas flow. In some embodiments, the target temperature is a function of exhaust flow (e.g., temperature, mass flow) and an ambient temperature in order to estimate a catalyst (e.g., SCR) temperature via one or more catalyst temperature models. In this embodiment, the target temperature is the estimated catalyst temperature based on the catalyst temperature model. After determining the target temperature and in response to the determined set of emission regulations, the controller may compare a current temperature of the SCR catalyst or the exhaust flow to the determined target temperature, and in response to the current temperature being below the determined target temperature, provide a thermal management command to achieve the determined target temperature. Technically and beneficially, the present disclosure enables thermal management of components in an aftertreatment system in response to location information. In operation and as described herein, the present disclosure enables pre-heating to or maintaining an operating temperature of a catalyst(s) in the aftertreatment system in order to meet various emissions regulations that may change as the vehicle travels along a route. By positively and pre-emptively adjusting the components based on local emissions regulations, which may be determined by tying location data to a database of emissions regulations, the present disclosure can aid in meeting changing emissions regulations while also avoiding wasted resources from unnecessary warming of catalysts when there is no legal requirement to do so.

Referring now to FIG. 1, a vehicle 10 with an engine 12, an aftertreatment system 70, a positioning system 42, and a controller 26 is shown, according to an example embodiment. The vehicle 10 can be any type of on-road or off-road vehicle including, but not limited to, line-haul trucks, mid-range trucks (e.g., pick-up truck, etc.), sedans, coupes, tanks, etc. In some embodiments, the vehicle 10 may be an airplane, boat, locomotive, and/or other types of vehicles. Based on these configurations, various additional types of components may also be included in the vehicle, such as a transmission, one or more gearboxes, pumps, actuators, and so on.

The engine 12 is structured as a compression-ignition internal combustion engine that utilizes diesel fuel. However, in various alternate embodiments, the engine 12 may be structured as any other type of engine (e.g., spark-ignition, a hybrid engine that uses a combination of an internal combustion engine and an electric motor) that utilizes any type of fuel (e.g., gasoline). Within the internal combustion engine 12, air from the atmosphere is combined with fuel, and combusted, to power the engine. Fuel is injected into each cylinder via one or more fuel injectors coupled to the engine. Combustion of the fuel from the fuel injector and air in the compression chambers (e.g., cylinders) of the engine 12 produces exhaust gas that is operatively vented to an exhaust manifold and to the exhaust aftertreatment system 70.

The engine 12 may include a plurality of cylinders. In the example shown, the engine 12 includes a first cylinder 112, a second cylinder 114, a third cylinder 116, a fourth cylinder 118, a fifth cylinder 120, and a sixth cylinder 122 (collectively referred to herein as "cylinders 112-122"). It should be understood that, while six cylinders are represented in FIG. 1, the number of cylinders may vary depending upon system configurations and requirements. The cylinders 112-122 can be any type of cylinders suitable for the engine in which they are disposed (e.g. sized and shaped appropriately to receive pistons).

The engine 12 includes a cylinder deactivation ("CDA") system 44 structured or configured to receive signals from the controller to selectively activate and deactivate (i.e. combustion does not occur) one or more of cylinders 112-122 during operation of the engine 12. A dynamic skip-fire ("DSF") system is a type of cylinder deactivation ("CDA") system. The CDA system operates to deactivate various cylinders of the engine (i.e., combustion does not occur), such that power from the engine is provided from less than all of the cylinders. The CDA system 44 may include the components to enable a CDA operating mode (e.g., intake valves, exhaust valves, solenoids to control the opening/closing of the valves, etc.). In some situations, one or more of the air intake valves may be closed so to not allow air for combustion to flow into the cylinder thereby preventing combustion. In other situations, air may be allowed to flow through the cylinder but combustion is prevented via no spark or diesel fuel injection. A DSF system operates an engine in a DSF mode, where one or more cylinders are deactivated/inactive (e.g., combustion does not occur) on a cycle-by-cycle and cylinder-by-cylinder bases, such that power from the engine is provided from less than all of the cylinders. Accordingly, a cylinder may be inactive for a first engine cycle and active for a second engine cycle. Another type of CDA operating mode is known as "fixed cylinder CDA." In fixed cylinder CDA, the same cylinder(s) are active/inactive each engine cycle during the fixed cylinder CDA operating mode, such that cylinders are pre-determined to be de-activated under pre-determined operating conditions. An "active" cylinder means that combustion is allowed to occur in that cylinder. Operating an engine in DSF mode can increase the temperature of the exhaust gas by reducing the overall flow of exhaust gas and/or requiring the active cylinders to produce the same amount of total work as the engine produced prior to entering a DSF mode. The CDA system 44 is configured or structured to operate in either the DSF mode or the fixed cylinder CDA operating mode.

Using fewer than the maximum number of cylinders 112-122 (in this exemplary embodiment, the maximum is 6) may result in improved fuel economy because operating a reduced number of cylinders requires a reduced amount of fuel. However, using fewer than 6 of the cylinders 112-122 may also result in a reduced power output, which may make navigating some roads and inclines difficult. As alluded to above, using fewer than 6 of the cylinders 112-122 may also result in an increased exhaust temperature than that produced during operation with all 6 cylinders 112-122 because the cylinders 112-122 that are activated operate at a higher combustion pressure to compensate for any inactive cylinders 112-122, which results in a higher combustion temperature. Thus, the CDA system 44 can be employed to increase the exhaust temperature.

The aftertreatment system 70 is in exhaust-gas receiving communication with the engine 12. The aftertreatment system includes a diesel oxidation catalyst (DOC) 72, a diesel particulate filter (DPF) 74, a reductant delivery system 78, a Decomposition Chamber 80 (e.g. reactor, reactor pipe, etc.), an SCR Catalyst 76, a catalyst sensor 82, a hydrocarbon (HC) doser 46, and a heater 48. The DOC 72 is structured to receive the exhaust gas from the engine 12 and to oxidize hydrocarbons and carbon monoxide in the exhaust gas. In order to properly assist in this reduction, the DOC 72 may be required to be at a certain operating temperature. In some embodiments, this certain operating temperature is between 200-500° C. In other embodiments, the certain operating temperature is the temperature at which the conversion efficiency of the DOC 72 exceeds a predefined threshold (e.g., the oxidation of HC to less harmful compounds, which is known as the HC conversion efficiency).

The DPF 74 is arranged or positioned downstream of the DOC 72 and structured to remove particulates in the exhaust gas stream. The DPF 74 includes an inlet, where the exhaust gas is received, and an outlet, where the exhaust gas exits after having particulate matter substantially filtered from the exhaust gas and/or converting the particulate matter into carbon dioxide. In some implementations, the DPF 74 may be omitted.

In some embodiments, the fuel injector is structured to inject an amount of fuel into one or more of the cylinders 112-122 after a combustion event in the cylinders 112-122. This injection is also referred to as an in-cylinder post-injection event. By injecting fuel into the cylinders 112-122 after combustion, the post-injected fuel tends to vaporize rather than combust in the cylinders 112-122. The non-combusted post-injected fuel does, however, react with one or more catalysts (e.g., the SCR catalyst 76) in the aftertreatment system 70 to produce heat (e.g., an exothermic reaction), which raises the temperature of the exhaust gas in the SCR system. In other embodiments, the HC doser 46 is located upstream of the DPF 74 and is structured to inject an amount of HC fuel (e.g., diesel fuel) into the exhaust gas stream. This injection is also referred to as an external post-cylinder HC fuel injection event. When the fuel is injected into the exhaust, the fuel combusts and raises the temperature of the exhaust, which later passes through the SCR catalyst 76 and raises the temperature of the SCR catalyst 76. The HC doser 46 is structured such that the in-cylinder fuel injection event and the external post-cylinder HC fuel injection event may occur independently (i.e., only one or the other) or simultaneously. This may be dependent on, for example, how far below the catalyst temperature is from the threshold temperature. If the catalyst temperature is more than a preset amount below the threshold temperature, both in-cylinder and out-cylinder injecting may be commanded. If the catalyst temperature below the threshold temperature but not more than the preset amount, only one of the in-cylinder and out-cylinder injecting may be used. This strategy is beneficial due to the savings on fuel used for the injecting by limiting when both injections are commanded.

The decomposition chamber 80 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 80 includes a reductant delivery system 78 having a doser configured to dose the reductant into the decomposition chamber 80 (e.g., via an injector). In some implementations, the reductant is injected upstream of the SCR catalyst 76. The reductant droplets then undergo the processes of evaporation, thermolysis, and hydrolysis to form gaseous ammonia. The decomposition chamber 80 includes an inlet in fluid communication with the DPF 74 to receive the exhaust gas containing NOx emissions, and an outlet for the exhaust gas, NOx emissions, ammonia, and/or reductant to flow to the SCR Catalyst 76.

The SCR catalyst 76 is configured to reduce NOx emissions by accelerating a NOx reduction process between the ammonia and the NOx of the exhaust gas into diatomic nitrogen, water, and/or carbon dioxide. If the SCR catalyst 76 is not at or above a certain temperature, the acceleration of the NOx reduction process is limited and the SCR system may not meet one or more regulations. In some embodiments, this certain temperature is 250-300° C. The SCR catalyst 76 includes an inlet in fluid communication with the decomposition chamber 80 from which exhaust gas and reductant are received. The SCR catalyst 76 may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum).

The heater 48 is located in the exhaust flow path before the SCR system and is structured or configured to controllably heat the exhaust gas upstream of the SCR system. The heater 48 may be any sort of external heat source that can be structured or configured to increase the temperature of passing exhaust gas, which, in turn, increases the temperature of the SCR catalyst 76. As such, the heater may be an electric heater, an induction heater, a microwave, or a fuel-burning (e.g., HC fuel) heater. As shown, the heater 48 is an electric heater that is powered from a battery of a vehicle 10. The heater may be of a convection type, where heat is transferred to flowing exhaust gas, or of a conduction type where the heater heats a component which transfers heat to the flowing exhaust gas.

The catalyst sensor 82 is structured or configured to sense at least one characteristic regarding the SCR catalyst 76. Thus, the catalyst sensor 82 may be one or more sensors arranged to measure or otherwise acquire data, values, or information regarding the characteristics or attributes of the SCR catalyst 76. The sensors may be all real sensors, all virtual sensors, or a combination thereof. In one embodiment, the catalyst sensor 82 is or includes a temperature sensor structured or configured to send a signal to the controller 26 indicative of the temperature of the SCR catalyst. For example, the catalyst sensor 82 may measure a temperature of a catalyst bed of the SCR catalyst 76. The controller 26 is configured to compare the temperature of the SCR catalyst 76 to a target temperature range of the SCR catalyst 76 to determine (e.g., compute, calculate, etc.) if the SCR catalyst 76 has a temperature that is outside of the target temperature range (e.g., the SCR catalyst 76 has a temperature that exceeds a target maximum temperature for the SCR catalyst 76, the SCR catalyst 76 has a temperature that does not exceed a target minimum temperature for the SCR catalyst 76, etc.). The target temperature range may be associated with temperatures where the SCR catalyst 76 performs optimal NOx reduction or NOx reduction at a rate prescribed by one or more regulations.

It should be understood that a plurality of sensors may be included in the aftertreatment system 70. For example, the system 70 includes a $NH_3$ sensor, NOx sensors, temperature sensors, and a particulate matter (PM) sensor. The $NH_3$ sensor may be structured to acquire data indicative of an NH₃ amount in the SCR. The temperature sensors may be structured to acquire data indicative of a temperature at their locations. In particular, the aftertreatment system 70 may include one or more temperature sensors structured to acquire data indicative of a temperature of the exhaust gas flowing through the aftertreatment system 70. The NOx sensors may be structured to acquire data indicative of a NOx amount at each location that the NOx sensor is located. The PM sensor may be structured to monitor particulate matter flowing through the exhaust aftertreatment system 70. The controller is communicably coupled to each of the sensors in the aftertreatment system 70. Accordingly, the controller 100 is structured to receive data from one more of the sensors. The received data may be used by the controller 100 to control one more components in the aftertreatment system and/or for monitoring and diagnostic purposes.

Although the exhaust aftertreatment system 70 shown includes a DOC, DPF, and SCR catalyst positioned in specific locations relative to each other along the exhaust flow path, in other embodiments, the exhaust aftertreatment system may include more than one of any of the various catalysts positioned in any of various positions relative to each other along the exhaust flow path as desired. Additionally, an AMOx catalyst may also be included. Further, although the DOC and AMOX catalyst are non-selective catalysts, in some embodiments, the DOC and AMOX catalyst can be selective catalysts. Thus, a wide variety of architectures are possible without departing from the scope of the present disclosure.

The positioning system 42 is configured to detect a position of the vehicle 10 at a point in time. In some embodiments, that point in time is the present moment, while in other embodiments, that point in time is upcoming and in the future. In an exemplary embodiment, the positioning system 42 is a global positioning system (GPS) in which the positioning system 42 receives GPS data from a satellite(s) and facilitates position-based communication with the satellite(s) and the controller 26. In another exemplary embodiment, the positioning system 42 is a communication system connecting the vehicle 10 to other vehicles in a fleet and receives a position of the vehicle 10 based on the relative position of the vehicle 10 to the other vehicles in the fleet, such as through triangulation. In another exemplary embodiment, the positioning system 42 is a communication system in communication with a plurality of beacons such that a position of the vehicle 10 is determined based on the position of the vehicle 10 relative to the plurality of beacons. This plurality of beacons may be towers built at certain points along roadways, existing infrastructure in place to collect tolls, or cell towers, to name but a few. Thus, the positioning system 42 may include a telematics device for telematics communication with a remote attendant or operator.

The positioning system 42 is any combination of these embodiments such that one embodiment may prevail if another is malfunctioning. For example, if the GPS is down, the positioning system 42 may rely on triangulation with other fleet vehicles.

The controller 26 is coupled to the engine 12, the aftertreatment system 70, and the positioning system 42, and is structured or configured to at least partly control the aftertreatment system 70 and, in some embodiments, the engine 12. When the sensors are structured as real sensors, the controller 26 receives signals from the catalyst sensor 82 and uses the signals received from the catalyst sensor 82 to analyze the temperature of the SCR catalyst 76 in the aftertreatment system 70 and perform various operations or actions in response to these signals and to information from the positioning system 42. The controller 26 also receives signals from the engine 12 regarding performance and operation of the engine 12.

As the components of FIG. 1 are shown to be embodied in the vehicle 10, the controller 26 may be structured or configured as one or more electronic control units (ECU), such as a microcontroller. The controller 26 may be separate from or included with at least one of a transmission control unit, an exhaust aftertreatment control unit, a powertrain control module, an engine control module, etc. The function and structure of the controller 26 is described in greater detail in FIG. 2.

Components of the vehicle 10 may communicate with each other or foreign components (e.g., a remote operator) using any type and any number of wired or wireless connections. Communication between and among the controller 26 and the components of the vehicle 10 may be via any number of wired or wireless connections (e.g., any standard under IEEE 802). For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

Figure 2:
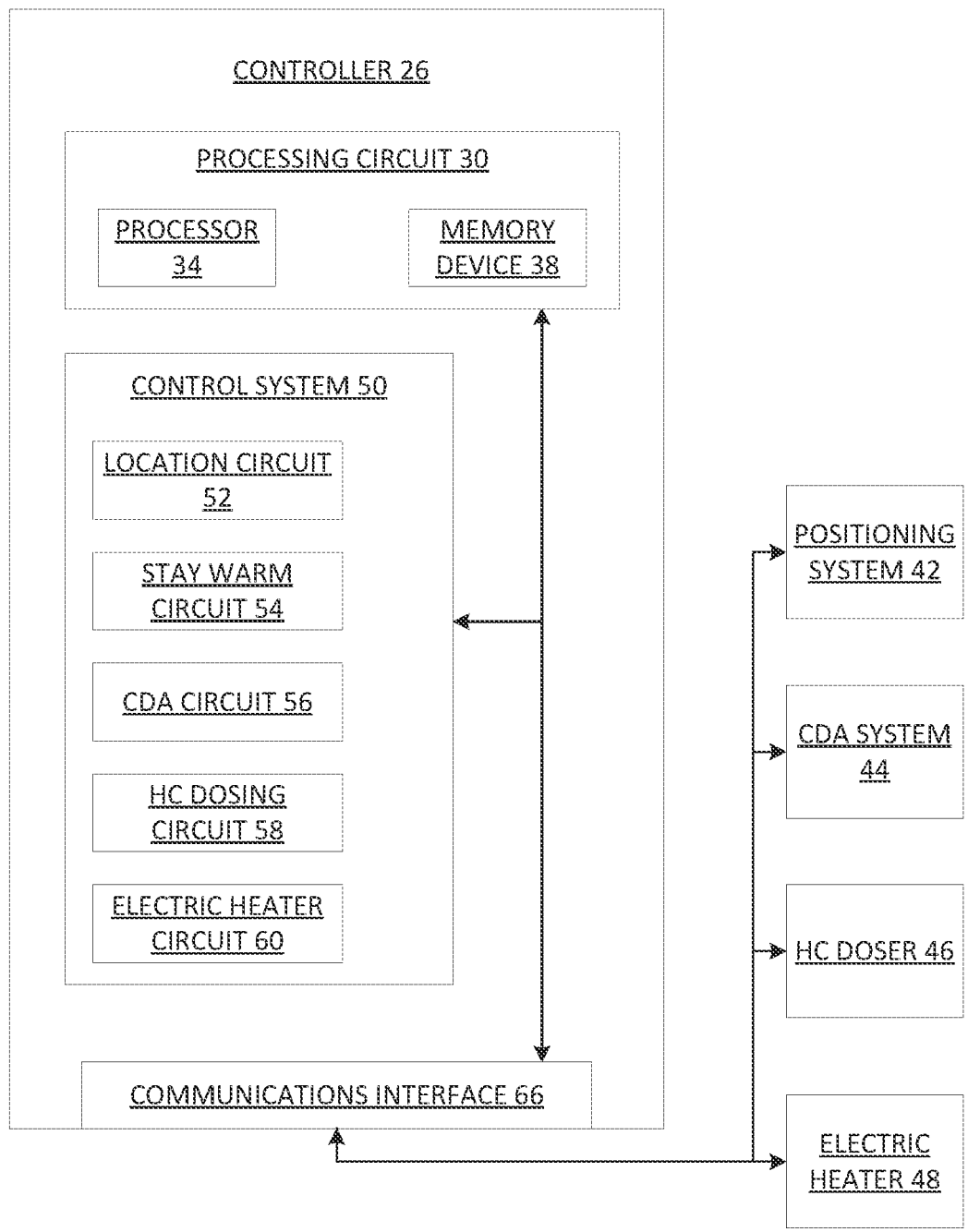
FIG. 2 is a schematic view of a controller of the vehicle of FIG. 1, according to an exemplary embodiment.

Referring now to FIG. 2, a schematic diagram of the controller 26 of the vehicle 10 of FIG. 1 is shown according to an example embodiment. As shown in FIG. 2, the controller 26 includes a processing circuit 30 having a processor 34 and a memory device 38, a control system 50 having a location circuit 52, a stay warm circuit 54, a CDA circuit 56, an HC dosing circuit 58, and an electric heater circuit 60, and a communications interface 66. Generally, the controller 26 is configured to receive information from the positioning system 42 about the geographic position of the vehicle 10 and information from the engine 12 and aftertreatment system 70 about the internal status of the vehicle 10. Then, based on this information, the controller 26 is configured to provide a thermal management command to various components of the vehicle 10, prioritizing components based on the information to enable SCR stay-warm and conform vehicle 10 emissions to the standards of the jurisdiction in which the vehicle 10 is present.

The thermal management commands may include, but are not limited to, to enable or disable the CDA system 44, to enable dosing via the HC doser 46, to increase fuel injection quantity or rate from a fuel injector, and to activate the electric heater 48. As used here, prioritizing refers to utilizing one or more components instead of another component to achieve the SCR stay-warm. In one example, if a state of charge (SOC) of a battery of the vehicle 10 is low (or another power source for the heater) as in below a predefined threshold (e.g., less than 50 percent state of charge), the controller prioritizes those components that do not use the battery (i.e., HC doser 46, fuel injectors, CDA system 44) instead of using those components that do use the battery (i.e., the heater 48). In a second example, if there is a driver preference to reduce fuel consumption and the SOC of the battery is above a predefined threshold, the controller 26 prioritizes those components that use the battery (i.e., the heater 48) rather than those components that use fuel (i.e., HC doser 46, fuel injectors). In a third example, if there is a driver preference to avoid use of the CDA system 44, the controller 26 prioritizes other components (i.e., the heater 46, HC doser 46, fuel injectors) rather than the CDA system 44. In a fourth example, if there are no restrictions (either due to status of the vehicle 10 or driver preference), the controller 26 may not prioritize any component over another and instead utilize any combination of the CDA system 44, HC doser 46, heater 48, and fuel injectors to raise the temperature of the aftertreatment system 70 component (or exhaust gas).

SCR "stay-warm" refers to a state at which the SCR catalyst 76 is at a desired level of operational ability corresponding to an ability to reduce pollutants (namely, NOx) for the given operational parameters of the vehicle (e.g., power output, ambient temperature and pressure, engine speed, vehicle speed, etc.). As described above, keeping the SCR catalyst (or another catalyst) warm promotes the intended catalytic activity of the SCR catalyst of reducing NOx to less harmful elements. The "stay-warm" may be defined and used in a variety of different ways. In one embodiment, SCR "stay-warm" may be defined as a temperature (or range of temperatures) of the SCR catalyst 76 (or a component proximate the catalyst) at which the SCR catalyst 76 is able to react with the exhaust gas and reductant to reduce the NOx in the exhaust gas at a predefined rate. This temperature may also be referred to as a target temperature for the SCR catalyst 76. In some embodiments, that temperature range is 250-300° C. In another embodiment, SCR "stay-warm" may also be defined as an efficiency of the SCR system, such that SCR system is reducing NOx at or above a predefined rate (e.g., a NOx conversion efficiency above a threshold, a low NOx standard of for example 0.02 g/bhp-hr, etc.). In yet another embodiment, the SCR stay-warm may be defined as a temperature of the exhaust gas present in the aftertreatment system 70, either immediately prior to entering the SCR system or at some other location in the aftertreatment system 70. In some embodiments, this temperature is 300° C. Thus, the stay warm may be defined in a variety of different ways, which are applicable at a variety of different times/arrangements (e.g., different engine system arrangements may utilize different stay-warm definitions, etc.).

Further and as mentioned above, while this disclosure primarily discusses stay-warm in reference to the SCR catalyst 76, the principles discussed herein should be taken as equally applicable to any component of the aftertreatment system 70 that has performance tied to temperature of the component, such as an oxidation catalyst (like the DOC 72) or an ammonia oxidation catalyst (AMOX). For example, the DOC 72, which is structured to oxidize hydrocarbons in the exhaust gas, operates more efficiently (i.e. oxidizes more hydrocarbons) at a certain operating temperature, similarly to the SCR catalyst 76. Therefore, the principles discussed herein with regard to the SCR stay-warm can also apply to a DOC stay-warm.

In one configuration, the location circuit 52, the stay warm circuit 54, the CDA circuit 56, the HC dosing circuit 58, and the electric heater circuit 60 are embodied as machine or computer-readable media that is executable by a processor, such as processor 34. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the location circuit 52, the stay warm circuit 54, the CDA circuit 56, the HC dosing circuit 58, and the electric heater circuit 60 are embodied as hardware units, such as electronic control units. As such, the location circuit 52, the stay warm circuit 54, the CDA circuit 56, the HC dosing circuit 58, and the electric heater circuit 60 may be embodied as one or more circuitry components including, but not limited to, processing circuitry, network interfaces, peripheral devices, input devices, output devices, sensors, etc. In some embodiments, the location circuit 52, the stay warm circuit 54, the CDA circuit 56, the HC dosing circuit 58, and the electric heater circuit 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the location circuit 52, the stay warm circuit 54, the CDA circuit 56, the HC dosing circuit 58, and the electric heater circuit 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The location circuit 52, the stay warm circuit 54, the CDA circuit 56, the HC dosing circuit 58, and the electric heater circuit 60 may also include programmable hardware devices such as field programmable gate arrays, programmable array logic, programmable logic devices or the like. The location circuit 52, the stay warm circuit 54, the CDA circuit 56, the HC dosing circuit 58, and the electric heater circuit 60 may include one or more memory devices for storing instructions that are executable by the processor (s) of the location circuit 52, the stay warm circuit 54, the CDA circuit 56, the HC dosing circuit 58, and the electric heater circuit 60. The one or more memory devices and processor(s) may have the same definition as provided below with respect to the memory device 38 and processor 34. In some hardware unit configurations, the location circuit 52, the stay warm circuit 54, the CDA circuit 56, the HC dosing circuit 58, and the electric heater circuit 60 may be geographically dispersed throughout separate locations in the vehicle. Alternatively and as shown, the location circuit 52, the stay warm circuit 54, the CDA circuit 56, the HC dosing circuit 58, and the electric heater circuit 60 may be embodied in or within a single unit/housing, which is shown as the controller 26.

In the example shown, the controller 26 includes the processing circuit 30 having the processor 34 and the memory device 38. The processing circuit 30 may be structured or configured to execute or implement the instructions, commands, and/or control processes described herein with respect to the location circuit 52, the stay warm circuit 54, the CDA circuit 56, the HC dosing circuit 58, and the electric heater circuit 60. The depicted configuration represents the location circuit 52, the stay warm circuit 54, the CDA circuit 56, the HC dosing circuit 58, and the electric heater circuit 60 as machine or computer-readable media. However, as mentioned above, this illustration is not meant to be limiting as the present disclosure contemplates other embodiments where the location circuit 52, the stay warm circuit 54, the CDA circuit 56, the HC dosing circuit 58, and the electric heater circuit 60, or at least one circuit of the location circuit 52, the stay warm circuit 54, the CDA circuit 56, the HC dosing circuit 58, and the electric heater circuit 60, is configured as a hardware unit. All such combinations and variations are intended to fall within the scope of the present disclosure.

The processor 34 may be single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. The processor may be a microprocessor, or, any processor, or state machine. The processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the location circuit 52, the stay warm circuit 54, the CDA circuit 56, the HC dosing circuit 58, and the electric heater circuit 60 may comprise or otherwise share the same processor which, in some example embodiments, may execute instructions stored, or otherwise accessed, via different areas of memory). Alternatively or additionally, the one or more processors may be structured or configured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 38 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 38 may be communicably coupled to the processor 34 to provide computer code or instructions to the processor 34 for executing at least some of the processes described herein. Moreover, the memory device 38 may be or include tangible, non-transient volatile memory or non-volatile memory. Accordingly, the memory device 38 may include database components, object code components, script components, or any other type of information structure for supporting the various activities and information structures described herein.

The location circuit 52 is structured or configured to receive information from the positioning system 42 and determine the emission regulations for the current location of the vehicle 10. This information can include an absolute position (such as coordinates of latitude and longitude), a relative position associated with another vehicle in a fleet of vehicles, or a binary value indicative of whether the vehicle 10 is in a location. Based on this information, the location circuit 52 determines a position of the vehicle 10. Then, the location circuit 52 determines the emissions regulations for a vehicle in that position, based on a source of emissions regulations. In some embodiments, this source of emissions regulations is a cloud-based database. This remote database may be constantly updated database by pulling regulation updates from the internet. In another embodiment, the controller 26 may be programmed with a map (e.g., a map of the U.S.) linked to emissions regulations. As such, the location circuit 52 may input location information into, e.g., a look-up table, and then recall or retrieve the emissions regulations for that location. The former embodiment may be advantageous in reducing the on-board storage of the memory device. In yet another embodiment, the source of emissions regulation may be an operator of the vehicle or a remote attendant who provides the information either over a radio, over a telephone, and/or a signal from the remote system. For example, the controller 26 may receive telematics data from an external computing system that provides the set of emissions regulations to the controller via the communications interface 66.

Further, the location circuit 52 may determine or predict an upcoming location of the vehicle 10 based on travel history of the vehicle on the current trip and using predictive analytics to extrapolate upcoming travel, travel history of the vehicle on past trips to predict upcoming travel, or a travel itinerary, where the travel itinerary is either preprogrammed before travel onto the controller 26 or received in real-time as telematics data via the communications interface 66. Based on this upcoming location data, the location circuit may determine emissions regulations for the upcoming location. For example, if an itinerary is programmed, the location circuit 52 may retrieve the emissions regulation for each location along the planned route. In another example, if the positioning system 42 malfunctions (i.e., the location circuit 52 is no longer receiving updated location data), the location circuit 52 may estimate an upcoming location for the vehicle 10 based on a last detected location and operational parameters (e.g., vehicle speed, direction, etc.). This may be a temporary estimate until GPS information becomes available.

In one embodiment, if the location circuit 52 is unable to determine the emissions regulations currently governing the vehicle 10, either due to an inability to determine the position of the vehicle or due to missing emission regulation information, the location circuit 52 sets the emission regulations for the vehicle 10 as the most stringent emission regulations stored in the source of emissions. For example, if the vehicle 10 enters an area for which the location circuit 52 does not have emission regulations information, the location circuit 52 sets the current emission regulations as the most stringent set of emissions regulations stored in the database. The advantage of this embodiment is to avoid situations in which the vehicle is overproducing emissions (i.e., producing emissions above a regulated level) by ensuring or attempting to ensure that the vehicle 10 is complying with the most stringent of standards. Further, this is an advantageous default when there is uncertainty in the system (e.g., uncertainty with the position of the vehicle and, in turn, the corresponding emissions regulations).

The location circuit 52 may also be structured to geofence areas around the vehicle to define a constant set of emissions regulations area. The geo-fenced area refers to an area surrounding the vehicle where at least one emissions regulation is constant (i.e., remains the same). By geo-fencing areas, the location circuit 52 may determine constant emissions regulations areas. Further, by utilizing geo-fencing, the location circuit 52 may save processing power for the controller 26 by establishing boundaries at which emissions regulations may change, thereby only processing a change in emissions regulations for the vehicle 10 when the location circuit 52 determines the position of the vehicle or predicts the upcoming location of the vehicle to be at or near the geo-fenced boundary (i.e., a place where the emissions regulations change).

In some embodiments, a separate geo-fenced area is associated with each regulated emission. For example, the location circuit 52 establishes one geo-fenced area that sets boundaries around an area with similar NOx regulations and a second geo-fenced area that sets boundaries around an area with similar HC regulations. In some situations, these two geo-fenced areas may be identical (i.e., the NOx and HC regulations are the same for a particular area). However, in some situations, these two geo-fenced areas may not be the same, which would be the case, for instance, if a particular area prioritizes lower NOx emissions while ignoring HC emissions.

In those situations in which the two geo-fenced areas are not the same, the location circuit 52 may define a transition area between the two geo-fenced areas. This transition area is defined in order to allow the temperature of the catalyst to reach the desired operating temperature. For example, if the second geo-fenced area has a more stringent emission regulation and therefore requires a higher catalyst temperature, the transition area is defined by the amount of time it will take to warm the catalyst to the higher temperature. As such, the location circuit 52 sets the emission regulations for the transition area as the more stringent of the sets of emission regulations governing the two geo-fenced areas. Defining the transition area also serves to account for any uncertainty with data from the positioning system 42 as to a clear boundary between the geo-fenced areas.

The stay warm circuit 54 is configured to receive position information from the location circuit 52, vehicle 10 information from the vehicle 10, and SCR Catalyst 76 information from the catalyst sensor 82 and to provide a thermal management command in response to determining that the SCR catalyst 76 is to stay warm. In an exemplary embodiment, the stay warm circuit 54 receives from the location circuit 52 that the vehicle 10 is in an Ultra-Low NOx jurisdiction, and the stay warm circuit 54 provides a thermal management command in response. In some embodiments, the stay warm circuit 54 receives information from the catalyst sensor 82 indicating that the SCR catalyst 76 is at the target temperature (i.e., a temperature at which the SCR catalyst 76 is reducing NOx in the exhaust gas at a desired efficiency) and disables the thermal management command. In other embodiments, the stay warm circuit 54 receives information from the one or more temperature sensors indicating that the exhaust gas temperature is at the target temperature (i.e., a temperature at which the exhaust gas is determined to be heating the SCR catalyst 76 to a predefined operating temperature or temperature range) and disables the thermal management command. As such, in some embodiments, the thermal management command may serve as a flag or indicator from the stay warm circuit 54 that the emissions regulations at the current or upcoming location of the vehicle 10 require a certain operating efficiency for the aftertreatment system 70. In order to reach and maintain this certain operating efficiency for the aftertreatment system 70, some components of the aftertreatment system 70, particularly the SCR catalyst 76, are to reach and maintain a certain operating temperature or target temperature. Accordingly, the thermal management command may serve as a flag or indicator from the stay warm circuit 54 that the temperature of some components of (or of the exhaust gas through) the aftertreatment system 70 is to be raised to the certain target temperature.

As such, the thermal management command, in some embodiments, is tied directly to the target temperature. In some embodiments, the target temperature is a pre-defined value for the temperature of the SCR catalyst 76. In other embodiments, the target temperature is associated with a target conversion efficiency of the SCR catalyst 76, such that the target temperature is the temperature of the SCR catalyst 76 at which the SCR catalyst 76 reduces a desired amount or percentage of NOx in the exhaust stream. In these embodiments, the value of the target temperature may then depend on the emissions regulations for the area in which the vehicle 10 is located because the local emissions regulations determine the desired amount of NOx, which in turn determines the target temperature. In further embodiments, the target temperature is associated with a modeled temperature of the catalyst (e.g., the SCR catalyst), which may be based on at least one of an exhaust temperature, an exhaust mass flow rate, or an ambient temperature. In this situation, a catalyst model (stored by the controller) correlates a temperature of a catalyst to determined values of ambient temperature, exhaust gas temperature, and/or ambient temperature. Thus, without having a catalyst temperature sensor, the catalyst temperature model may be used by the controller to estimate a catalyst temperature based on these determined values. In yet further embodiments, the target temperature is a pre-defined value for a temperature of exhaust gas flowing through the aftertreatment system 70.

In those embodiments in which the location circuit 52 is determining upcoming travel data, the stay warm circuit 54 may factor these upcoming emission regulations into the commands. For example, if the location circuit 52 indicates that the vehicle 10 will soon be traveling in a geographic area with stricter emission regulations than those in the current location, the stay warm circuit 54 may provide the thermal management command in anticipation of the higher standards, thereby pre-emptively warming the SCR catalyst 76 to the desired operating temperature before the stringent emission regulations. Conversely, if the location circuit 52 indicates that the vehicle 10 will soon be traveling in a geographic area with less strict emission regulations than those in the current location, the stay warm circuit 54 may disable the thermal management command in anticipation of the lower standards, thereby saving unnecessary resource expenditure. Or, the circuit 54 may provide a thermal management command commensurate with the less stringent requirements (i.e., demand less heating of the catalyst because not as stringent emissions requirements are experienced). By adjusting the thermal management command in these situations, the circuit 54 avoids expending resources (e.g., battery power, fuel, etc.) when not otherwise required to by local law.

In those embodiments in which the location circuit 52 sets different geo-fenced areas for each emission regulation (i.e., one geo-fence set for NOx regulations, one geo-fence set for HC regulations), the stay warm circuit 54 provides particular thermal management commands accordingly. For example, if the location circuit 52 has established a geo-fenced area with regard to a relatively relaxed NOx emissions regulation and the location circuit 52 determines that the vehicle 10 is approaching the boundary of the geo-fenced area and entering into a geo-fenced area with stricter NOx emissions regulations, then the stay warm circuit 54 may provide a thermal management command related to only those components that affect NOx emissions (e.g., the SCR catalyst 76).

However, in some embodiments, the stay warm circuit 54 may not provide or may disable or provide a different thermal management command if the SCR catalyst 76 (or other related component of the aftertreatment system 70) and/or exhaust gas reaches or is already at the desired operating (i.e., target) temperature. For example, in the situation above in which the vehicle 10 will soon enter a geo-fenced area with stricter emissions regulations, the stay warm circuit 54 may not provide the thermal management command it might otherwise provide if the stay warm circuit 54 receives indication that the temperature of the SCR catalyst 76 (e.g., from the catalyst sensor 82) or of the exhaust gas (e.g., from the one or more temperature sensors) is already at the target temperature. Similarly, if a NOx emissions output (i.e., an amount of NOx remaining in the exhaust gas after the exhaust has passed through the aftertreatment system 70) is acceptable (e.g., at or below local regulations, below a pre-determined target value, etc.) even if the catalyst or exhaust gas temperature is below the predefined temperature, the stay warm circuit may not provide or may disable or provide a different thermal management command, regardless of the temperature of the SCR catalyst or exhaust gas. In this regard, thermal management commands are bypassed due to emissions being acceptable despite conditions existing for less-than-best catalyst activity (e.g., catalyst temperatures below the pre-defined target or threshold temperature).

The target temperature may be a predefined temperature (e.g., 250° C.) or may be a temperature at which the SCR catalyst is achieving a pre-defined conversion efficiency, which is demonstrated by a relatively low value of NOx output from the aftertreatment system 70 (e.g., 0.02 g/bhp-hr). In those embodiments in which the target temperature is defined by an amount of NOx output from the aftertreatment system 70, the target temperature may be different in jurisdictions with different emissions regulations, as a stricter emissions regulation may require a different operating temperature of the SCR catalyst 76. As such, the target temperature may be determined, in part, by location-specific information from the location circuit 52. Alternatively, if the vehicle has been in operation for longer than a pre-defined period of time (e.g., 2 hours), the stay warm circuit 54 may decline to provide the thermal management command because the SCR catalyst 76 (or other related component of the aftertreatment system 70) has reached the desired operating temperature (and therefore desired operating efficiency) through standard operation of the engine 12 for that length of time. In other embodiments, the target temperature may be defined as a temperature of the exhaust gas at which the exhaust gas is expected to heat the SCR catalyst (or other related component of the aftertreatment system 70) to a desired operating temperature, or may be defined as a function of at least one of exhaust temperature, exhaust mass flow rate, or ambient temperature via a catalyst model as described herein.

In some embodiments, the stay warm circuit 54 provides a thermal management command without input from the location circuit 52. In these embodiments, the stay warm circuit 54 determines whether the SCR catalyst 76 (or other components of the aftertreatment system 70) is to be kept warm throughout the entire period that the engine 12 is keyed off based on predictive capabilities. For instance, if the engine 12 is keyed off when fuel levels are low, the stay warm circuit 54 predicts that the vehicle 10 is stopped to be refueled and provides a thermal management command in anticipation of a short stop so that the SCR catalyst 76 is kept at the certain operating temperature throughout the short stop.

In some embodiments, the stay warm circuit 54 receives an indication from the location circuit 52 that the vehicle 10 is in a jurisdiction that requires driver breaks. In response, the stay warm circuit 54 determines that a period of vehicle 10 inactivity (i.e., a period in which the engine 12 is keyed-off) is a jurisdiction-mandated break, and the stay warm circuit 54 disables the thermal management command in anticipation of the longer (i.e., longer than a refueling stop) time period of a jurisdiction-mandated break and then provides the thermal management command a short time before the driver break would end in order to warm the SCR Catalyst 76 in anticipation of vehicle 10 activity, thereby working to achieve a certain operating efficiency for the SCR catalyst 76 before vehicle 10 activity so there is no spike (i.e., relatively sudden increase) in emissions upon resuming driving. In another exemplary embodiment, the stay warm circuit 54 receives information regarding the driving schedule for the vehicle 10 and provides thermal management commands based on that driving schedule in order to pre-emptively warm the SCR Catalyst 76 during scheduled breaks.

The CDA circuit 56 is configured to receive the thermal management command from the stay warm circuit 54 and to determine whether it is viable to utilize the CDA system 44 to keep the SCR Catalyst 76 warm. In making this determination, the CDA circuit analyzes CDA parameters. These CDA parameters may include driver preference to avoid the extra noise, vibration, and harshness that accompany CDA system 44 operation, overall CDA system 44 durability, engine 12 lubricant levels, and anticipated engine 12 power output. For example, if the CDA circuit 56 receives the thermal management command from the stay warm circuit 54 and the vehicle 10 will be traveling downhill for the next two miles and has a decreased power requirement, the CDA circuit 56 sends a signal to the CDA system 44 to activate, as the decreased power requirement means that the engine 12 is able to meet the requirement even with the decreased power output that accompanies an active CDA system 44. Further, based on the thermal management command, the CDA circuit 56 may alter or modulate an amount of deactivated cylinders, such that if the thermal management command indicates that the temperature of the SCR catalyst 76 is to be raised by a great amount (i.e. the vehicle 10 is being started after a long break), the CDA circuit 56 will direct the CDA system to increase the number of deactivated cylinders in order to more drastically increase temperatures.

The HC dosing circuit 58 is configured to receive the thermal management command from the stay warm circuit 54 and to determine whether it is viable to utilize the HC dosing via the HC doser 46 or the fuel injector to keep the SCR Catalyst 76 warm. In making this determination, the HC dosing circuit 58 analyzes HC parameters. These HC parameters may include the vehicle 10 fuel levels, as HC dosing consumes fuel. In this exemplary embodiment, if the stay warm circuit 54 provides the thermal management command but the fuel level of the vehicle 10 is low, the HC dosing circuit 58 sends a signal to the HC doser 46 and/or the fuel injector to disable dosing. Further, based on the thermal management command, the HC dosing circuit 58 may alter or modulate an amount of dosing fuel or may utilize a combination of the in-cylinder fuel injection event with the fuel injector and the external post-cylinder HC injection event with the HC doser 46, such that if the thermal management command indicates that the temperature of the SCR catalyst 76 is to be raised by a great amount (i.e. the vehicle 10 is being started after a long break), the HC dosing circuit will direct the HC doser 46 and/or the fuel injector to provide a great amount of fuel or to utilize both the in-cylinder fuel injection event and the external post-cylinder HC injection event simultaneously.

The electric heater circuit 60 is configured to receive the thermal management command from the stay warm circuit 54 and to determine whether it is viable to utilize the electric heater 48 to keep the SCR Catalyst 76 warm. In making this determination, the electric heater circuit 60 analyzes electric heater parameters. These electric heater parameters may include the vehicle 10 battery levels. In this exemplary embodiment, if the stay warm circuit 54 provides the thermal management command but the battery level of the vehicle 10 is low, the electric heater circuit 60 sends a signal to the electric heater 48 to disable heating. Further, based on the thermal management command, the electric heater circuit 60 may alter or modulate an amount of heating from the electric heater 48, such that if the thermal management command indicates that the temperature of the SCR catalyst 76 is to be raised by a great amount (i.e. the vehicle 10 is being started after a long break), the electric heater circuit 60 will direct the electric heater 48 to provide a great amount of heating. In some embodiments, engaging the electric heater 48 is prioritized over the other responses to the thermal management command (i.e., CDA and HC dosing) due to the lack of fuel consumption.

Figure 3:
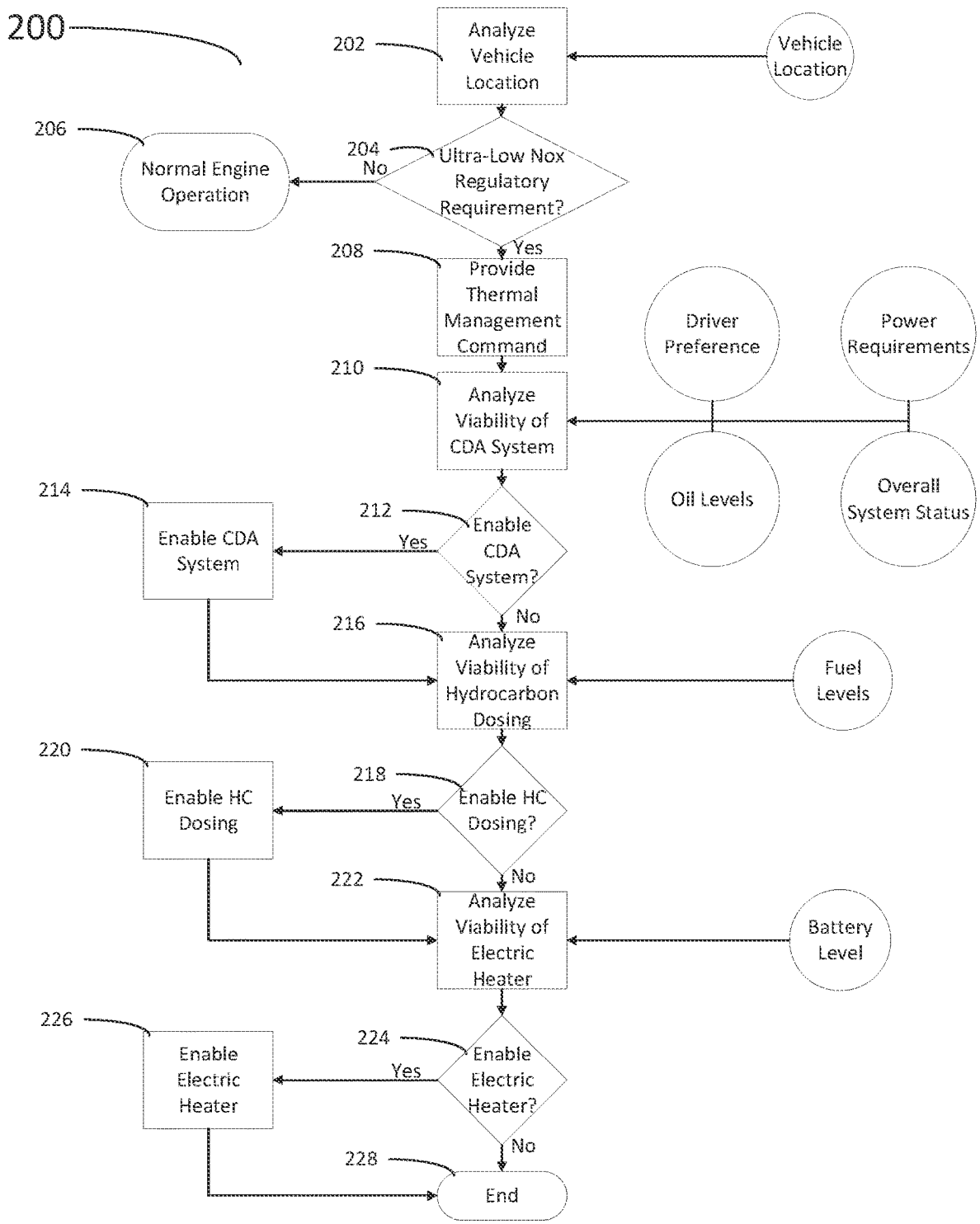
FIG. 3 is a flow diagram of a method of enabling a catalyst stay-warm process in response to a physical location of a vehicle, according to an exemplary embodiment.

Referring now to FIG. 3, a method 200 for enabling and disabling SCR stay-warm and related procedures based on physical location is shown according to an exemplary embodiment. The method 200 begins at step 202, where the controller 26 (via the location circuit 52) analyzes the location of the vehicle. At step 204, the controller 26 (via the location circuit 52) determines whether an ultra-low NOx requirement is in place at the location of the vehicle 10. If no, normal engine 12 operation continues at step 206. If yes, the controller 26 (via the stay warm circuit 54) provides the thermal management command at step 208.

The controller 26 (via the CDA circuit 56) then analyzes the viability of the CDA system at step 210 by considering driver preference, power requirements, oil levels, and overall vehicle 10 system status. If operation of the CDA system is viable based on analysis at step 210, the controller 26 (via the CDA circuit 56) sends a signal at step 212 to enable the CDA system 44 at step 214 and then proceeds to step 216. If operation of the CDA is not viable, the controller 26 (via the HC dosing circuit 58) analyzes the viability of HC dosing at step 216 based on the fuel levels of the vehicle 10. If HC dosing is viable based on analysis at step 216, the controller 26 (via the HC dosing circuit 58) sends a signal at step 218 to the HC doser 46 to enable at step 220 and then proceeds to step 222. If HC dosing is not viable, the controller 26 (via the electric heater circuit 60) analyzes the viability of operating the electric heater 48 at step 222 based on the battery level of the vehicle 10. If it is viable to operate the electric heater 48, the controller 26 (via the electric heater circuit 60) sends a signal at step 224 to the electric heater 48 at step 226 to enable. Otherwise, the controller 26 ends the method at step 228.

Thus, the controller 26 is configured or structured to manage the HC doser 46, the CDA system 44, and the heater 48 based on situation and location. For example, in a situation in which the SCR catalyst 76 is to be heated as quickly as possible due to an imminently approaching area with strict emissions regulations, the controller 26 may issue commands to activate all three components in order to provide as much heating ability as possible. As such, each of the HC doser 46, the CDA system 44, and the heater 48 may be activated and operating simultaneously in response to a single thermal management command from the controller 26. Beneficially, utilizing all these thermal management commands in unison may promote temperature increases in an expeditious manner when the catalyst temperature is below the predefined threshold. Simultaneous issuance of these commands may, however, be subject to an analysis of operating conditions of the vehicle (e.g. the battery of the vehicle 10 that provides power to the heater 48 is below a pre-defined SOC (e.g., predefined SOC threshold value or level), so only the CDA system 44 and the HC doser 46 are engaged). As such, the controller 26 analyzes a particular situation (i.e., current location, local emissions regulations, operating conditions of the vehicle 10, temperature of components of the aftertreatment system 70, etc.) and issues commands to various components in response to this analysis (e.g., if the temperature of the SCR catalyst is below 250° C., the vehicle 10 is approaching an area with strict emissions regulations, and the SOC of the battery is above 50%, the controller 26 will issue a command to activate the heater 48 in order to raise the temperature of the SCR catalyst 76).

Furthermore, in some embodiments, if the controller 26 determines that each of the HC doser 46, the CDA system 44, and the heater 48 is viable (i.e., able to be engaged based on current operating conditions), the controller 26 prioritizes and in turn engages the heater 48 rather than the HC doser 46 and the CDA system 44 in order to avoid excess fuel consumption. Because engaging the heater 48 may not directly consume fuel while both the HC doser 46 and CDA system 44 involve some level of fueling, by engaging the heater 48 instead of the CDA system 44 or HC doser 46, the controller 26 avoids or substantially avoids additional fuel consumption while still adequately satisfying the thermal management command.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 26 may include any number of circuits for completing the functions described herein. For example, the activities and functionalities of the location circuit 52, the stay warm circuit 54, the CDA circuit 56, the HC dosing circuit 58, and the electric heater circuit 60 may be combined in multiple circuits or as a single circuit. Additional circuits with additional functionality may also be included. Further, the controller 26 may further control other activity beyond the scope of the present disclosure.

As mentioned above and in one configuration, the "circuits" may be implemented in machine-readable medium for execution by various types of processors, such as the processor 34 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured or configured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps. It is important to note that the construction and arrangement of the system as shown in the various exemplary embodiments is illustrative only. Additionally, any element disclosed in one embodiment may be incorporated or utilized with any other embodiment disclosed herein.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A system, comprising:
    a controller comprising at least one processor coupled to a memory storing instructions that, when executed by the at least one processor, causes the controller to perform operations comprising:
    determining a set of emission regulations based on a location of a vehicle;
    determining a target temperature of a catalyst of an aftertreatment system of the vehicle in response to the determined set of emission regulations;
    comparing a current temperature of the catalyst to the determined target temperature; and
    in response to the current temperature of the catalyst being below the determined target temperature, providing a thermal management command to increase the catalyst temperature toward the determined target temperature.

2. The system of claim 1, wherein the catalyst is a selective catalytic reduction (SCR) catalyst, and
    wherein the set of emission regulations govern a quantity or rate of nitrous oxide (NOx) emissions.

3. The system of claim 1, wherein the operations further comprise dynamically determining a geo-fence area, the geo-fence area comprising a geographical area that is subject to a same set of emission regulations.

4. The system of claim 3, wherein a first geo-fenced area and a second geo-fenced area are governed by at least one same emission regulation, and wherein the operations further comprise providing a same thermal management command in each of the first and second geo-fenced areas responsive to the location of the vehicle being in either the first or second geo-fenced areas.

5. The system of claim 3, wherein the dynamic determination of the geo-fence area is based on a set of a plurality of geo-fence areas stored in the memory of the controller, the memory further storing at least one associated emission regulation for each geo-fence area.

6. The system of claim 3, wherein the dynamic determination of the geo-fence area is based on telematics data received from a remote computing system.

7. The system of claim 1, wherein the thermal management command includes at least one of deactivating an electric heater, commanding a hydrocarbon (HC) doser, increasing a fuel injection quantity or rate from a fuel injector, or engaging a cylinder deactivation (CDA) system in response to a state of charge (SOC) of a battery of the vehicle being below a predefined SOC value.

8. The system of claim 1, wherein the thermal management command includes activating an electric heater in response to receiving a driver preference to reduce fuel consumption and a state of charge (SOC) of a battery of the vehicle being at or above a predefined SOC threshold level.

9. The system of claim 1, wherein the thermal management command includes at least one of activating an electric heater, commanding a hydrocarbon (HC) doser, or increasing fuel injection quantity or rate from a fuel injector in response to a driver preference to avoid use of a cylinder deactivation (CDA) system.

10. The system of claim 1, wherein the thermal management command includes activating an electric heater, commanding a hydrocarbon (HC) doser, increasing fuel injection quantity or rate from a fuel injector, and engaging a cylinder deactivation (CDA) system in response to the temperature of the catalyst being below a predetermined temperature threshold.

11. The system of claim 1, wherein the operations further comprise disabling the thermal management command in response to a detected or determined amount of emissions meeting a related emissions regulation of the set of emissions regulations.

12. A method, comprising:
    determining, by a controller, a set of emission regulations based on a location of a vehicle;
    determining, by the controller, a target temperature of a catalyst of an aftertreatment system of the vehicle in response to the determined set of emission regulations;
    comparing, by the controller, a current temperature of the catalyst to the determined target temperature; and
    in response to the current temperature of the catalyst being below the determined target temperature, providing, by the controller, a thermal management command to increase the catalyst temperature toward the determined target temperature.

13. The method of claim 12, further comprising dynamically determining, by the controller, a geo-fence area, the geo-fence area comprising a geographical area that is subject to a same set of emission regulations.

14. The method of claim 13, wherein a first geo-fenced area and a second geo-fenced area are governed by at least one same emission regulation, and wherein the method further comprises providing, by the controller, a same thermal management command in each of the first and second geo-fenced areas responsive to the location of the vehicle being in either the first or second geo-fenced areas.

15. The method of claim 12, wherein the thermal management command includes at least one of deactivating an electric heater, commanding a hydrocarbon (HC) doser, increasing a fuel injection quantity or rate from a fuel injector, or engaging a cylinder deactivation (CDA) system in response to a state of charge (SOC) of a battery of the vehicle being below a predefined SOC value.

16. The method of claim 12, wherein the thermal management command includes activating an electric heater in response to receiving a driver preference to reduce fuel consumption and a state of charge (SOC) of a battery of the vehicle being at or above a predefined SOC level.

17. The method of claim 12, wherein the thermal management command includes activating an electric heater, commanding a hydrocarbon (HC) doser, increasing a fuel injection quantity or rate from a fuel injector, and engaging a cylinder deactivation (CDA) system in response to the temperature of the catalyst being below a pre-determined temperature threshold.

18. A system, comprising:
   a controller comprising at least one processor coupled to a memory storing instructions that, when executed by the at least one processor, causes the controller to perform operations comprising:
      determining a set of emission regulations based on a location of a vehicle;
      determining a target temperature of exhaust gas in an aftertreatment system of the vehicle in response to the determined set of emission regulations;
      comparing a current temperature of the exhaust gas to the determined target temperature; and
      in response to the current temperature of the exhaust gas being below the determined target temperature, providing a thermal management command to increase an exhaust gas temperature toward the determined target temperature.

19. The system of claim 18, wherein the target temperature is further based on at least one of a mass flow rate of exhaust gas or an ambient temperature.

20. The system of claim 18, wherein the thermal management command includes activating an electric heater, commanding a hydrocarbon (HC) doser, increasing fuel injection quantity or rate from a fuel injector, and activating a cylinder deactivation (CDA) system in response to the temperature of the exhaust gas being below a pre-determined temperature threshold.

* * * * *